INVENTOR.
Howard M. Geyer
BY
Craig V. Morton
Attorney

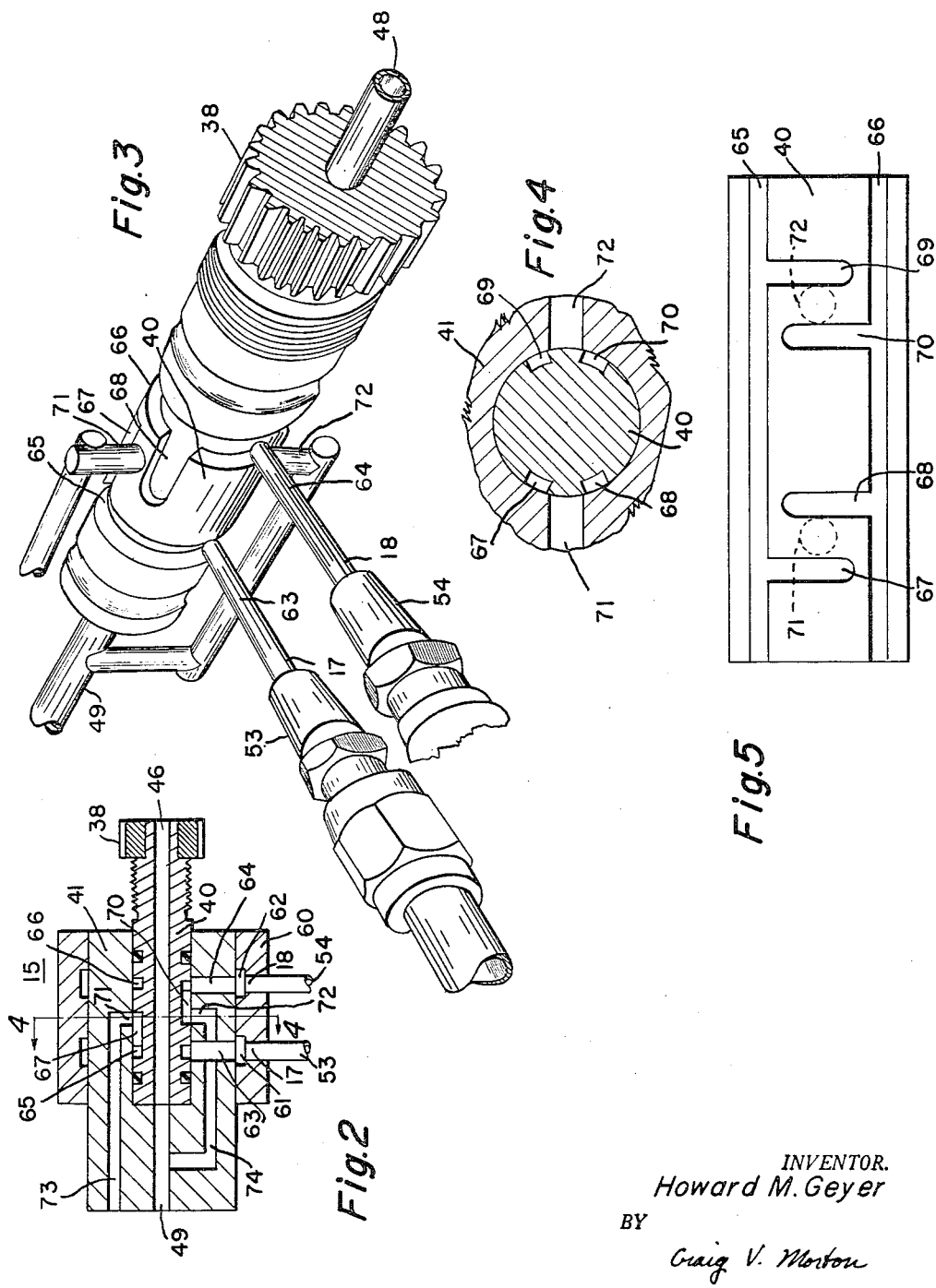

United States Patent Office 2,774,337
Patented Dec. 18, 1956

2,774,337

ACTUATOR ASSEMBLY WITH LOAD SENSING MEANS

Howard M. Geyer, Dayton, Ohio, assignor to General Motors Corporation, Detroit, Mich., a corporation of Delaware Application August 27, 1953, Serial No. 376,945

8 Claims. (Cl. 121—41)

The present invention pertains to actuators, and more particularly to rotary actuators incorporating means whereby the operator will sense, or feel, the force exerted by, or the load imposed on, the actuator.

Heretofore, difficulties have been encountered with the use of power amplifying devices, such as fluid pressure operated actuators, by reason of the fact that the operator had no sensation of the magnitude of the force being exerted, or the amount of work accomplished, by the actuator. Thus, it is manifest that an actuator incorporating means requiring the operator to exert a force proportional, percentagewise, to the magnitude of the force being exerted by the actuator, would be highly advantageous. Accordingly, among my objects are the provision of an actuator including means whereby the operator will sense, or feel, the magnitude of the force being exerted by the actuator; the further provision of an actuator assembly wherein the "feel back" or the force which the operator must exert to effect operation of a power actuator, is proportional to the magnitude of the force exerted, or the amount of work accomplished by the power actuator; the further provision of an actuator assembly including a power operable actuator and a manually operable actuator constructed and arranged so that actuation of the power operable actuator is dependent upon actuation of the manually operable actuator; and the still further provision of control means for an actuator assembly of the aforesaid type.

The aforementioned and other objects are accomplished in the present invention by providing an actuator assembly including a manually operable actuator, a power operable actuator, and means controlled by actuation of said manually operable actuator for effecting actuation of said power operated actuator. The power and manually operable actuators are of identical construction with the former being the larger, as is readily understandable. The power actuator is operated by fluid under pressure, the application of pressure fluid being controlled by a manually operable valve. The actuators include cylinders having helically splined interior surfaces and pistons having axially extending skirts. The skirts are formed with helically splined interior and exterior surfaces, the exterior surfaces of which engage the cylinder splines. The splined interior surfaces of the piston skirt engage helically splined members supported for rotation within their respective stationary cylinder. The pistons are mounted for reciprocable movement within the cylinders, and by reason of the helical spline connection between the pistons and their cylinders, and the pistons and the rotatable splined members, linear piston movement will be accompanied by a small angular piston movement, which angular piston movement is multiplied by the spline teeth to effect a substantial angular movement of the rotatably supported splined members.

In the present invention a manually operable member is provided for effecting movement of the rotatable splined member in the manual actuator, this rotation effecting consequent linear movement of the manual piston. In the power actuator, fluid under pressure is employed to effect linear movement of the piston in either direction so as to effect angular movement of its rotatable splined member, which is operatively connected to an arm for actuating any suitable load device. A rotary valve is employed to selectively control the supply and drain connections to opposite sides of the power actuator piston, the rotary valve being manually operable inasmuch as it is operatively connected with the manually rotatable splined member of the manual actuator. The rotatable splined member of the power actuator includes an axially extending sleeve, which cooperates with the rotary valve to form a follow-up mechanism for interrupting the flow of fluid to and from the power actuator cylinder when the movement called for by the manual actuator has been accomplished by the power actuator. The cylinder chambers of the two actuators are connected by conduits such that the operator must exert a force to move the valve, proportional to the magnitude of the force exerted on the power actuator by the load device. Stated in other words, the operator must exert a force proportional to the force exerted by the power actuator.

In operation, a predetermined rotative movement of the manual actuator effects the same predetermined rotative movement of the power actuator. The load imposed upon the manually operable actuator is proportional, percentagewise, and is of the same sense as the load imposed upon the power actuator. The load exerted upon the power actuator manifests itself in the power actuator in the form of pressure which may resist actuator movement in one direction and assist movement of the actuator in the opposite direction. By reason of the cylinders of the power and manual actuators being interconnected, the same load sensation is transmitted to the manual actuator and the control lever therefor. It is to be understood that the actuator cylinders are, at all times, maintained full of fluid.

Further objects and advantages of the present invention will be apparent from the following description, reference being had to the accompanying drawings wherein a preferred embodiment of the present invention is clearly shown.

In the drawings:

Fig. 2 is a schematic sectional view of the valve mechanism employed to control movements of the power actuator.

Fig. 3 is an enlarged fragmentary view, in perspective, of the control valve shown in Fig. 2.

Fig. 4 is an enlarged sectional view taken along line 4—4 of Fig. 2.

Fig. 5 is a development of the rotary valve element shown in Fig. 4.

Figure 1:
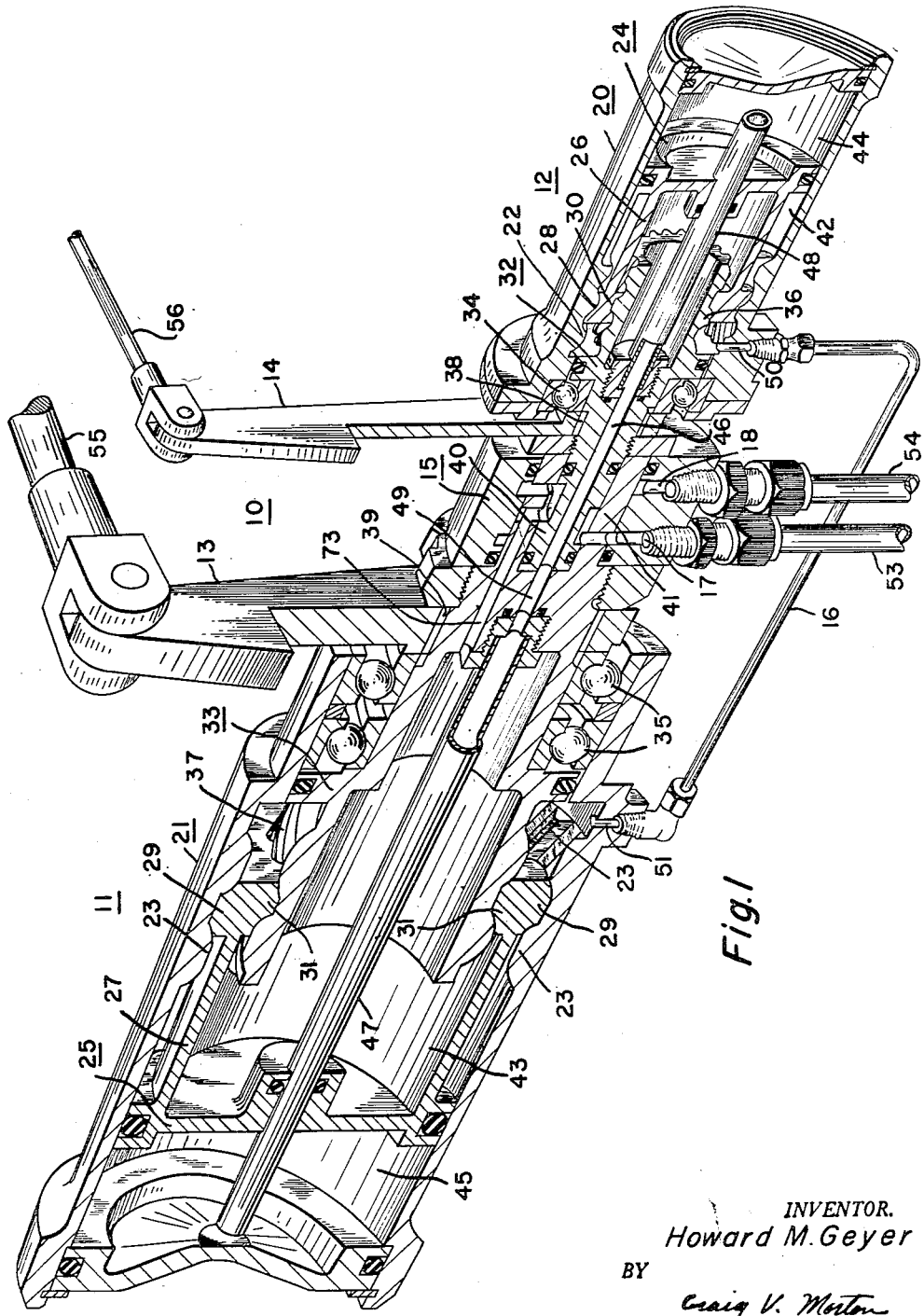
Fig. 1 is a longitudinal sectional view, in perspective, of an actuator assembly constructed according to this invention.

With particular reference to Fig. 1, an actuator assembly, indicated generally by the numeral 10, is shown including a power actuator 11 and a manually operable actuator 12. The actuator asssembly also includes a first rotatable control arm 13, movements of which are effected by the power actuator 11, and a second rotatable control arm 14 operatively connected to the manual actuator 12 for effecting operation thereof. A rotary, follow-up valve assembly 15 is situated between the power and manual actuators, the valve assembly including an element operable by the manual actuator for controlling the operation of the power actuator, and an element operable by the power actuator for following up the movement of the manual actuator so as to disrupt the power connections to the power actuator when the movement selected by the manual control arm 14 is accomplished by the power control arm 13.

A power operable actuator 11 includes a cylinder 21 having internal helical spline teeth 23. A piston 25 having a head portion sealingly engaging a smooth walled interior portion of the cylinder 21, is mounted for reciprocable movement within the cylinder. The piston 25 includes an axially extending annular skirt portion 27 having an external helically splined portion 29 and an internal helically splined portion 31. The externally splined portion 29 of the skirt 27 operatively engages the splined portion 23 of the cylinder 21. A member 33 is rotatably supported within the cylinder 21 by bearing means 35. The member 33 includes a helically splined portion 37, the splined portion 31 of the piston skirt 27 having operative engagement with the splined portion 37. The member 33 also includes a straight splined portion 39, which operatively engages a similar straight splined portion of the control arm 13, such that rotation of the member 33 will be imparted to the control arm 13. In addition, the member 33 includes an annular sleeve portion 41 forming part of the valve assembly 15, which will be discussed more fully hereinafter.

The manually operable actuator 12 is constructed in a manner identical to that of the power actuator 11, but is considerably smaller. Thus, the manual actuator includes a cylinder 20 having an internal helically splined portion 22. A reciprocable piston 24 is disposed within a smooth walled portion of the cylinder 20, the piston 24 having an axially extending annular skirt 26 having an externally helically splined portion 28 and internally helically splined portion 30. The actuator further includes a member 32 rotatably supported by a bearing means 34 within the cylinder 20 having a helically splined portion 36. In a similar manner, the splined portions of the piston skirt 26 engage the cylinder splines and the splines on rotatable member 32. However, inasmuch as the pistons 24 and 25 of the manual and power actuators are designed to move in opposite directions, the splined portions of the power actuator are of a different sense than the splined portions of the manual actuator. Thus, for example, the splined portions in the power actuator may be of the left-hand sense, while the splined portions of the manual actuator may be of the right-hand sense, such that movement of their respective pistons will effect rotation of members 32 and 33 in the same direction.

In each instance, the pistons of both actuators divide their respective cylinders into two chambers, which for convenience will be termed extend and retract chambers. Thus, the piston 24 divides the cylinder 20 into an extend chamber 42 and a retract chamber 44, while the piston 25 divides the cylinder 21 into an extend chamber 43 and a retract chamber 45. The rotatable member 32 of the manual actuator 12 includes a straight splined portion 38 having connection with the control arm 14 and also includes a hollow portion 40 forming the valve element of the valve assembly 15, to be described hereinafter. The retract actuator chambers 44 and 45 are interconnected by a transfer tube 47, which passes through the piston 25 of the power actuator 11 and communicates with a central bore 49 in the member 33. The member 32 is also provided with a central bore 46 having connection with the bore 49 and with a transfer tube 48 which extends through the piston 24 of the manual actuator 12 and is open to the retract chamber 44. The extend chambers 42 and 43 of the actuators are interconnected by a conduit 16 having connection with a port 50 of the manual actuator and with a port 51 in the power actuator. The helical spline connections in the power and manual actuators are constructed with sufficient clearance to permit the passage of fluid from the extend chambers to the conduit 16. The valve assembly 15 includes a housing having port openings 17 and 18, which are connected, respectively, to a pressure supply conduit 53 and a drain conduit 54. The power actuator control arm 13 may be connected by means of a rod 55 to any suitable load device, not shown, and the control arm 14 of the manual actuator may be connected by a rod 56 to a control lever, not shown.

With particular reference to Figs. 2 through 5, the valve assembly 15 will next be described. As is shown schematically in Fig. 2, the valve assembly includes a stationary housing 60 having ports 17 and 18 connected with supply and drain conduits 53 and 54, respectively. Concentrically disposed within the housing 60 are the valve sleeve 41 and the valve element 40. The housing is formed with a pair of annular grooves 61 and 62, which have connection with ports 17 and 18, respectively. The valve sleeve 41 is formed with a pair of spaced ports 63 and 64, that are disposed in alignment with annular grooves 61 and 62 of the housing 60. The valve element 40 also includes a pair of spaced annular grooves 65 and 66, which are disposed in alignment with the ports 63 and 64 of the sleeve 41.

With particular reference to Figs. 2, 3 and 5, it may be seen that annular groove 65 has extending therefrom a pair of longtiudinally extending grooves 67 and 69, while annular groove 66 has extending therefrom a pair of longitudinal grooves 68 and 70. The groves 67 and 70 are separated by an angle of substantially 180°, and the same angle separates grooves 68 and 69.

The sleeve 41 is further provided with a pair of diametrically opposed valve ports 71 and 72, which are disposed so as to be in alignment with the ends of the longitudinal grooves 67 through 70 in the valve element 40. Valve port 71 connects with a passage 73 in the sleeve 41, which opens into the extend actuator chamber 43 of the power actuator 11, as is shown in Fig. 1, while valve port 72 connects with a passage 74 in the sleeve 41, which, in turn, connects with passage 49 and the transfer tube 47 to the retract chamber 45 of the power actuator 11, as shown in Fig. 1. As is seen particularly in Figs. 3 through 5, the grooves 68 through 70 and the ports 71 and 72, are arranged so that in the neutral position of the valve element 40, there is very little positive overlap. By positive overlap is meant a condition where the grooves and ports are not in fluid communication and, as is seen in Figs. 4 and 5, particularly, only a very small movement of the element 40 relative to the valve sleeve 41 is required to place a pair of the grooves in communication with the valve ports 71 and 72.

Operation

The actuator assembly herein described operates in the following manner, presupposing that conduit 53 is connected to a source of fluid under pressure and conduit 54 is connected to drain, or a minimum back pressure supply. When the operator effects manual movement of a control lever, not shown, so as to extend the manual actuator 12 through rod 56 and control arm 14, thereby calling for an extended movement of the power actuator 11, the following sequence of steps will ensue. Presupposing that the load device, not shown, connected to control arm 13 and rod 55 of the power actuator exerts a load on the power actuator 11, tending to retract this actuator, this load will partake the form of pressure loading in the retract chamber 45 tending to move piston 25 to the right, as viewed in Fig. 1. The degree of pressure exerted on the fluid in retract chamber 45 will be transmitted proportionally to the retract chamber 44 of the manual actuator 12. Thus, as the operator moves the control arm 14 in a counterclockwise direction, as viewed in Fig. 1, which effects counterclockwise movement of the valve element 40, as shown in Figs. 1, 3 and 4, this movement will be resisted by a force proportional, percentagewise, to the load imposed on the power actuator 11. Thus, the operator will sense, or feel, the load as he attempts to move the control arm 14 in a counterclockwise direction.

When the operator overcomes this load on the manual actuator so as to effect movement of piston 24 to the right by a rotating member 32, the valve element 40 will be so that port 71 of the sleeve 41 is connected with longitudinal groove 67, annular groove 65, port 63, annular groove 61, port 17 and the pressure supply conduit 53. At the same time, port 71 is connected by means of longitudinal groove 70, annular groove 66, port 64, annular groove 62 and port 18 to the drain conduit 54. This will result in an application of high pressure fluid from port 71 through passage 73 to the extend actuator chamber 43 of the power actuator, while the retract chamber 45 is connected to the drain conduit through the transfer tube 47, passage 49 and port 72. Thus, the application of pressure to extend chamber 43 of the power actuator will effect movement of piston 25 to the left, as viewed in Fig. 1, and by reason of extend actuators chambers 43 and 42 being interconnected, the extend chamber 24 of the manual actuator 12 will be maintained full of fluid during manual movement of the piston 24 to the right, as viewed in Fig. 1. Concurrently, movement of piston 25 to the left will force fluid from the retract chamber 45 to drain, as will movement of piston 24 exhaust fluid from retract chamber 44 to drain.

It is to be understood that linear movement of the pistons 24 and 25 is accompanied by a small angular, or twisting movement thereof, by reason of the helical spline connections between the pistons, cylinders, and the movable splined members. Thus, if control arm 14 is moved 10° in a counterclockwise direction, the valve element 40 will also be moved 10° in a counterclockwise direction, which, in turn, will effect movement of the piston 25 to the left. Linear movement of piston 25 to the left will be combined with a twisting movement and when the member 33 and the arm 13 have been moved throughout the angular distance of 10° in a counterclockwise direction, the follow-up sleeve 41 will also have moved 10° so as to shut off all communication between sleeve ports 71 and 72 and valve grooves 67 through 70.

Again, presupposing that the load transmitted to control arm 13 tends to move actuator piston 25 to the right, as viewed in Fig. 1, should the operator desire to retract the power actuator by moving the control arm 14 in a clockwise direction, he will again experience the sensation of "feel back." However, in this instance, as the load is imposing a thrust in the direction he has selected to move it, the feel will be of opposite sense. That is, the control arm 14 will tend to move by itself in a clockwise direction and he will have to exert a predetermined force to restrain such movement. Clockwise movement of the arm 14 and the valve element 40 completes the fluid circuit connections so that pressure fluid is applied to the retract chamber 45 of the power actuator 11 and the extend chamber 43 is connected to drain.

From the foregoing, it is readily apparent that the present invention provides an actuator system in which the operator will always be cognizant of the movement effected by the power actuator. Thus, the operator will sense, percentagewise, the load the power actuator is moving. In this manner, the operator will be apprised of the control being effected through operation of the actuator assembly.

While the embodiment of the present invention as herein disclosed, constitutes a preferred form, it is to be understood that other froms might be adopted.

What is claimed is as follows:

1. An actuator assembly including in combination, a fluid pressure operated power actuator comprising a cylinder having disposed therein a reciprocable piston capable of fluid pressure actuation in either direction, a manually operable actuator comprising a cylinder having disposed therein a reciprocable piston capable of manual actuation in either direction and a member operatively connected to said manually actuated piston so as to be rotated upon piston movement, and valve means disposed between the actuators and operatively associated with said actuators for controlling the application of pressure fluid to said power actuator, said valve means including a valve element integral with the rotatable member of said manually operable actuator so that movement of said manually operable actuator piston controls the application of pressure fluid to said power actuator, the construction and arrangement being such that the force required to actuate the manually operable actuator is proportional, percentagewise, to the force exerted by the power operable actuator.

2. An actuator assembly including in combination, a fluid pressure operated power actuator comprising a cylinder having disposed therein a reciprocable piston capable of fluid pressure actuation in either direction and a member operatively connected to said piston so as to be rotated upon piston movement, a manually operable actuator comprising a cylinder having disposed therein a reciprocable piston capable of manual actuation in either direction and a member operatively connected to said manually actuated piston so as to be rotated upon piston movement, and valve means disposed between said actuators and operatively associated with said actuators for controlling the application of pressure fluid to said power actuator, said valve means including a valve element integral with said rotatable member of the manually operable actuator and a follow-up sleeve integral with the rotatable member of said power actuator, the construction and arrangement being such that the force required to actuate the manually operable actuator is proportional, percentagewise, to the force exerted by the power operable actuator.

3. An actuator assembly including in combination, a fluid pressure operated power actuator comprising a cylinder having disposed therein a reciprocable piston capable of fluid pressure actuation in either direction, and a member rotatably journaled in said power cylinder and having a helical spline connection with said piston such that movement of said piston effects rotation of said member, a manually operable actuator comprising a cylinder having disposed therein a piston capable of manual actuation in either direction, and a member rotatably journaled in said manual cylinder and having a helical spline connection with said manual piston whereby rotation of said manual member effects movement of said manual piston, and valve means disposed between said two actuators for controlling the application of pressure fluid to said power actuator, said valve means including a rotary valve element integral with the rotatable member of the manual actuator and a follow-up sleeve integral with the rotatable member of the power actuator whereby manual movement of the rotatable member of the manual actuator controls the application of pressure fluid to said power actuator, the construction and arrangement being such that the force required to actuate the rotatable member of the manual actuator is proportional, percentagewise, to the force exerted by the power actuator.

4. An actuator assembly including in combination, a fluid pressure operated power actuator comprising a cylinder having disposed therein a reciprocable piston, said piston having an axially extending skirt, and a member rotatably supported in said power cylinder and having a helical spline connection with said skirt whereby movement of said power piston effects rotation of said member, a manually operable actuator comprising a cylinder having disposed therein a reciprocable piston capable of manual actuation in either direction, said manual piston having an axially extending skirt, and a member rotatably supported in said manual cylinder and having a helical spline connection with the skirt of said manual piston whereby rotation of said manual member will effect movement of said manual piston, means operatively connected with said manual member for effecting rotation thereof, and valve means disposed between said actuators for controlling the application of pressure fluid to said power actuator, said valve means being operatively connected to the rotatable members of both actuators whereby movement of the rotatable member of the manual actuator controls the application of pressure fluid to said power actuator.

5. The combination set forth in claim 4 wherein the valve means include a rotary valve element integral with the rotatable member of the manual actuator and the follow-up sleeve integral with the rotatable member of the power actuator.

6. An actuator assembly including in combination, a fluid pressure operated power actuator comprising a cylinder having disposed therein a reciprocable piston capable of fluid pressure actuation in either direction, said piston having an axially extending skirt, and an annular member rotatably supported in said cylinder and having a helical spline connection with said skirt whereby piston reciprocation effects rotation of said member, means connecting the annular member of said power actuator to an output lever, a manually operable actuator comprising a cylinder having disposed therein a reciprocable piston capable of manual actuation in either direction, said manual piston having an axially extending skirt, and a member rotatably journaled in said manual cylinder and having a helical spline connection with the skirt of said manual piston whereby rotation of said manual member will effect movement of said manual piston, means connecting said manual member with a rotatable input lever, and a valve assembly disposed between said cylinders including a housing attached to said cylinders, a rotary valve element disposed in said housing and being integral with the rotatable member of said manual actuator, and a follow-up sleeve circumscribing said rotary valve element and being integral with the rotatable member of said power actuator whereby operation of said input lever will rotate said valve element so as to control the application of pressure fluid to said power actuator, and rotation of the member in said power actuator due to movement of said power piston will position said valve sleeve to interrupt the application of fluid pressure to said power actuator.

7. The combination set forth in claim 6 wherein said rotary valve element comprises a spool having a pair of axially spaced grooves, each of said grooves having a pair of laterally extending grooves communicating therewith, and wherein said valve sleeve includes a pair of diametrically opposed ports having connection with said power cylinder on opposite sides of said piston.

8. The combination set forth in claim 7 wherein one of the ports in said valve sleeve communicates with a passage in said rotatable member of the power actuator for connecting said one port with the power actuator cylinder on one side of said power piston, and wherein the other port in said valve sleeve communicates with a through bore in the rotatable member of said power actuator, said power actuator including a transfer tube which communicates with the through bore in the rotatable member of said power actuator and extends through said power piston for connecting said other port with the power cylinder on the other side of said power piston.

References Cited in the file of this patent

UNITED STATES PATENTS

| 243,450 | Lafargue | June 28, 1881 |
| 1,872,714 | Farley | Aug. 23, 1932 |
| 1,946,309 | Coffman | Feb. 6, 1934 |
| 1,947,991 | Jessup | Feb. 20, 1934 |
| 2,369,324 | Thompson | Feb. 13, 1945 |
| 2,370,137 | Biggert | Feb. 27, 1945 |
| 2,376,804 | Orshansky | May 22, 1945 |
| 2,472,236 | Thomas | June 7, 1949 |
| 2,627,847 | Clark | Feb. 10, 1953 |

FOREIGN PATENTS

| 668,388 | France | July 9, 1929 |
| 316,011 | Great Britain | July 25, 1929 |